United States Patent
Robertson, Jr. et al.

(10) Patent No.: US 10,526,919 B2
(45) Date of Patent: Jan. 7, 2020

(54) BOLT ATTACHMENT TO COMPOSITE FAN CASE

(71) Applicant: United Technologies Corporation, Hartford, CT (US)

(72) Inventors: Thomas Joseph Robertson, Jr., Glastonbury, CT (US); Steven Clarkson, Cheshire, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1039 days.

(21) Appl. No.: 14/802,486

(22) Filed: Jul. 17, 2015

(65) Prior Publication Data
US 2016/0017753 A1 Jan. 21, 2016

Related U.S. Application Data

(60) Provisional application No. 62/026,775, filed on Jul. 21, 2014.

(51) Int. Cl.
*F01D 25/24* (2006.01)
*B23P 19/04* (2006.01)

(52) U.S. Cl.
CPC ............. *F01D 25/24* (2013.01); *B23P 19/04* (2013.01); *F05D 2260/31* (2013.01)

(58) Field of Classification Search
CPC .......... F01D 25/08; F01D 25/10; F01D 25/12; F01D 25/14; F01D 25/24; F01D 25/243; F01D 25/28
See application file for complete search history.

(56) References Cited

U.S. PATENT DOCUMENTS

| 5,267,828 | A | 12/1993 | Lenhart et al. |
| 8,021,102 | B2 | 9/2011 | Xie et al. |
| 8,079,773 | B2 | 12/2011 | Blanton |
| 8,672,609 | B2 * | 3/2014 | Lussier ................ F01D 21/045 415/197 |
| 9,328,629 | B2 * | 5/2016 | Scott ....................... F01D 25/24 |
| 9,982,605 | B2 * | 5/2018 | Robertson ............ F01D 21/045 |
| 2009/0010755 | A1 | 1/2009 | Keller et al. |
| 2012/0177490 | A1 | 7/2012 | Lussier et al. |
| 2013/0224012 | A1 * | 8/2013 | Durocher ................ F01D 25/28 415/213.1 |

FOREIGN PATENT DOCUMENTS

| EP | 2474712 | 7/2012 |
| WO | 2013165505 | 11/2013 |
| WO | 2014081500 | 5/2014 |

OTHER PUBLICATIONS

EP Extended Search Report for European Application No. 15176452.9 dated Dec. 2, 2015.

* cited by examiner

*Primary Examiner* — Carlos A Rivera
*Assistant Examiner* — Cameron A Corday
(74) *Attorney, Agent, or Firm* — Carlson, Gaskey & Olds, P.C.

(57) ABSTRACT

A fan case includes a composite fan case body including an outer surface and at least one attachment tool attached to the outer surface of the fan case body. The attachment tool includes a boss that has at least one fastener opening with a threaded insert. A channel extends from at least one interior cavity of the attachment tool through an outer wall of the attachment tool.

12 Claims, 3 Drawing Sheets

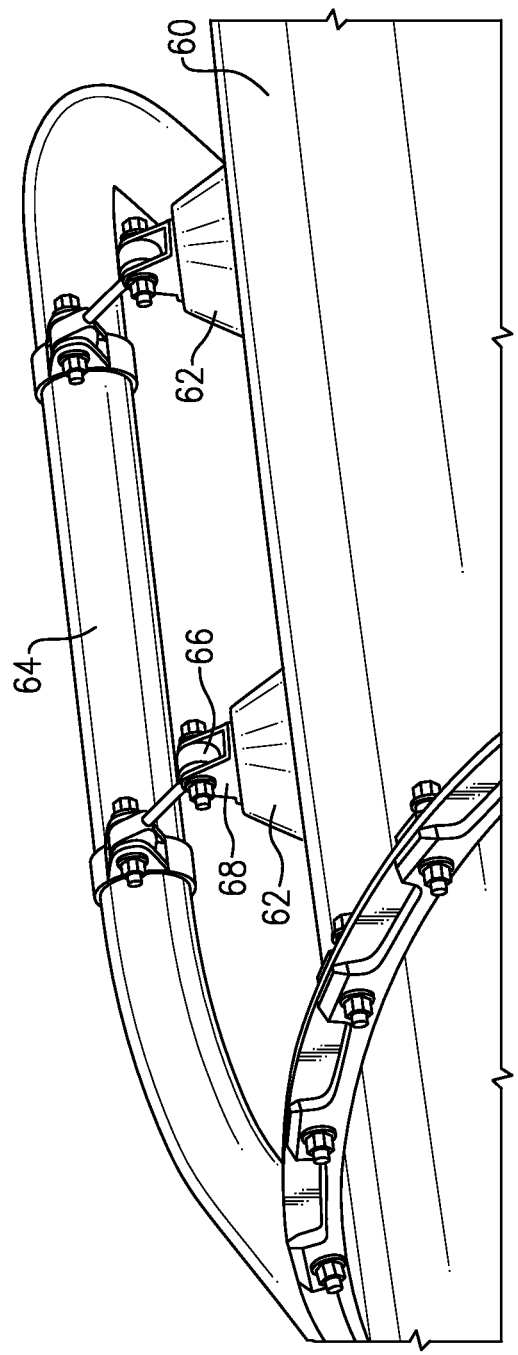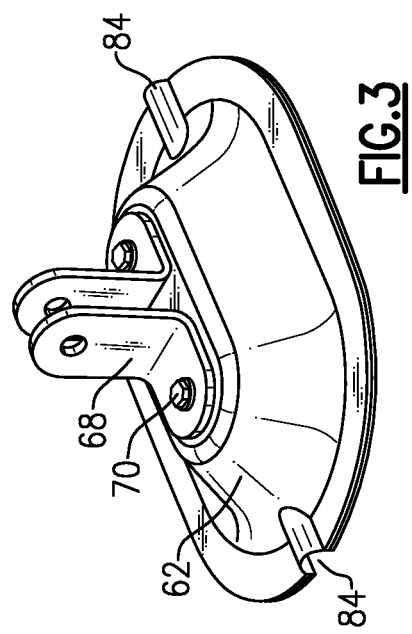

BOLT ATTACHMENT TO COMPOSITE FAN CASE

CROSS-REFERENCE TO RELATED APPLICATIONS

This application claims priority to U.S. Provisional Application No. 62/026,775, which was filed on Jul. 21, 2014 and is incorporated herein by reference.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

In a continued effort to reduce the weight of a gas turbine engine, a case surrounding the fan rotor has been manufactured of a composite material, such as carbon epoxy, to further reduce weight.

Although composite fan cases are light weight and include several other favorable characteristics, one challenge with composite fan cases is attaching components to the case. In general, components have been attached with threaded fasteners extending through the case. However, threaded fasteners through the composite material may degrade structural capability of the containment case.

SUMMARY

In one exemplary embodiment, a fan case includes a composite fan case body including an outer surface and at least one attachment tool attached to the outer surface of the fan case body. The attachment tool includes a boss that has at least one fastener opening with a threaded insert. A channel extends from at least one interior cavity of the attachment tool through an outer wall of the attachment tool.

In a further embodiment of the above, the fan case is made of a composite material and includes an accessory attached to at least one of the attachment tool.

In a further embodiment of any of the above, the attachment tool is made of at least one of a molder thermoplastic material or a fabricated material.

In a further embodiment of any of the above, the threaded insert directly engages the molded thermoplastic material of the attachment tool.

In a further embodiment of any of the above, the threaded insert includes at least one of a helical insert or a key-locking insert.

In a further embodiment of any of the above, at least one attachment tool is bonded directly to the outer surface on the fan case.

In a further embodiment of any of the above, the fan case includes a mate face on a distal end of the outer wall for engaging the fan case.

In a further embodiment of any of the above, the channel separates a first mate face from a second mate face.

In a further embodiment of any of the above, at least one rib extends between the outer wall and the boss.

In a further embodiment of any of the above, at least one rib partially defines at least one interior cavity and includes at least one of a passage or a recessed area that extends through at least one rib to fluidly connect adjacent interior cavities.

In another exemplary embodiment, an attachment tool for being attached to an outer surface of a fan case in a gas turbine engine includes a boss that has at least one fastener opening for accepting a threaded insert for engaging a fastener. An outer wall is spaced from the boss forming at least one interior cavity. A channel extends from at least one cavity through the outer wall.

In a further embodiment of the above, the attachment tool is made of a molded thermoplastic material and the threaded insert directly engages the molded thermoplastic material.

In a further embodiment of any of the above, the threaded insert includes at least one of a helical insert or a key-locking insert.

In a further embodiment of any of the above, a mate face is on a distal end of the outer wall for engaging the fan case. The channel separates a first mate face from a second mate face.

In a further embodiment of any of the above, at least one rib extends between the outer wall and the boss. At least one rib partially defines at least one interior cavity and includes at least one of a passage or a recessed area that extends through at least one rib to fluidly connect adjacent interior cavities.

In another exemplary embodiment, a method of forming an attachment tool for being attached to an outer surface of a case in a gas turbine engine includes attaching the attachment tool to the fan case. The attachment tool includes at least one fastener opening with a threaded insert and equalizing pressure between at least one internal cavity of the attachment tool and an outermost surface of the attachment tool.

In a further embodiment of the above, the attachment tool is made of a molded thermoplastic material and the threaded insert directly engages the molded thermoplastic material of the attachment tool.

In a further embodiment of any of the above, the threaded insert includes at least one of a helical insert or a key-locking insert.

In a further embodiment of any of the above, the attachment tool includes a channel that fluidly connects the at least one internal cavity and the outermost surface.

In a further embodiment of any of the above, the attachment tool includes at least one rib that extends between an outer wall and a boss. At least one fastener opening extends into the boss. At least one rib partially defines at least one interior cavity and includes at least one of a passage or a recessed area that extends through at least one rib to fluidly connect adjacent interior cavities.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 2 schematically shows a fan case according to the present invention.
FIG. 3 shows a detail.

DETAILED DESCRIPTION

Figure 1:
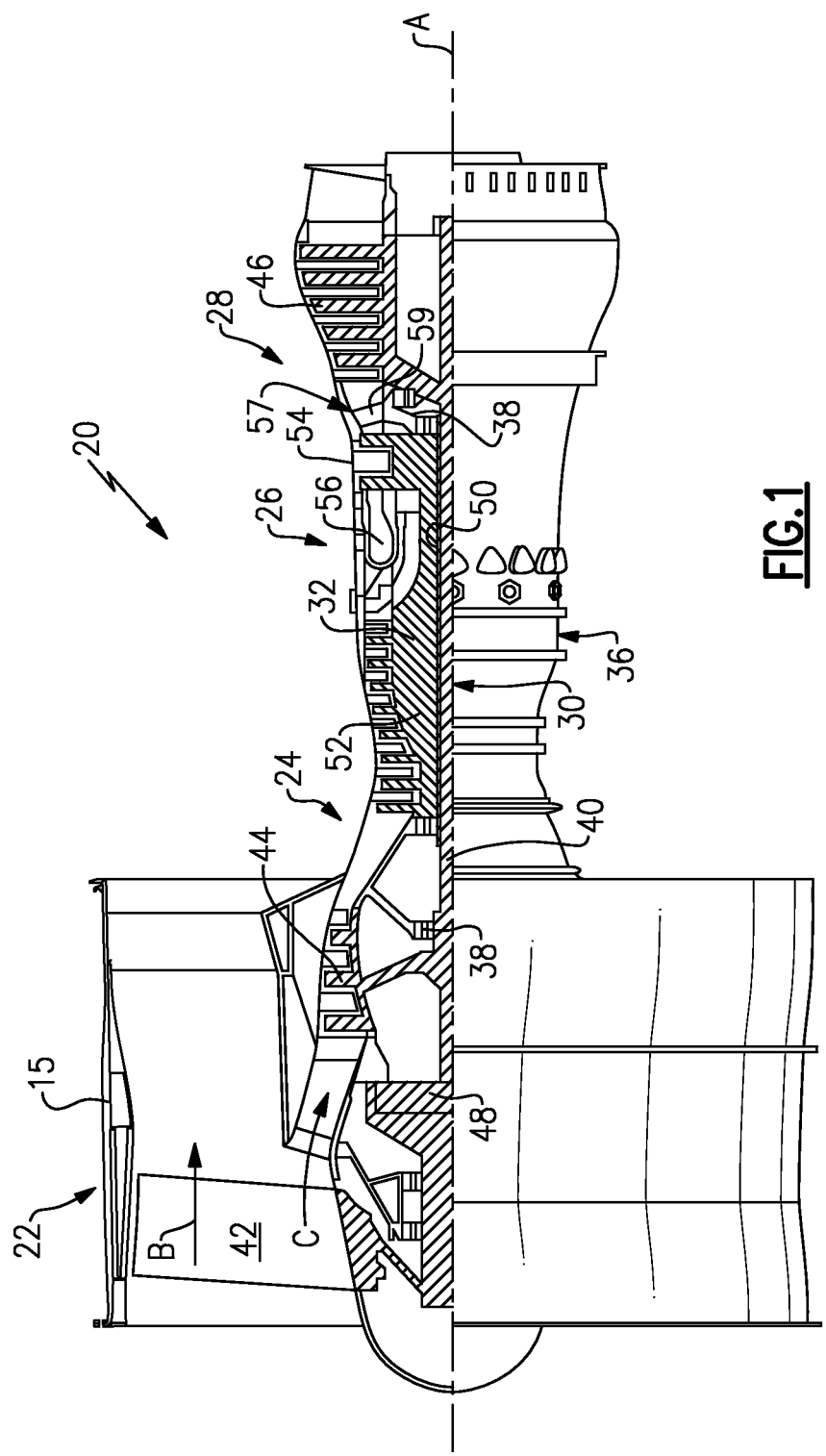
FIG. 1 shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

A composite fan case 60 is shown in FIG. 2. The fan case 60 is part of the gas turbine engine 20 and includes the fan 42 (see FIG. 1) delivering air downstream towards the compressor section 24. By making the fan case 60 out of a composite material, the overall weight of the gas turbine engine 20 can be reduced and the overall efficiency can be increased.

In place of mechanical fasteners, multiple threaded bolt attachments 62 or attachment tools are mounted to an outer surface of the fan case 60 with an adhesive material, such as an epoxy. The lack of mechanical fasteners reduces the number of openings through the fan case 60 which can weaken the integrity of the fan case 60. The bolts attachments 62 are molded from a polymer, such as a thermoplastic or thermoset material and are used as connecting structure or implement. Alternatively, the bolt attachments 62 are made from a fabricated material.

A component 64 is attached to the bolt attachments 62, such as through pins 66 mounted at brackets 28. In this example, the component 64 is shown as a holding bracket for a fluid tube. However, any number of other components and types of mountings may benefit from the present disclosure. The bracket 68 is threadably attached, such as by bolts 70 (see FIG. 3) to the bolt attachment 62.

Figure 4:
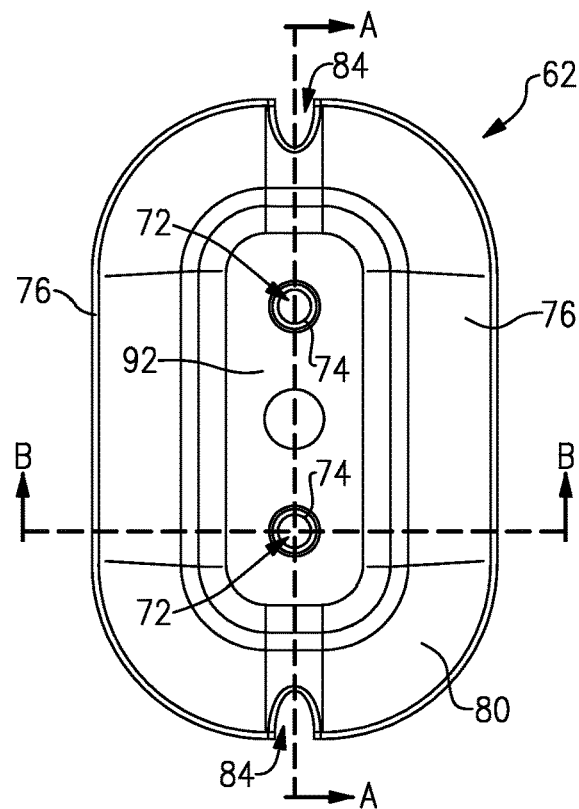
FIG. 4 is a view of a bolt attachment.
Figure 5:
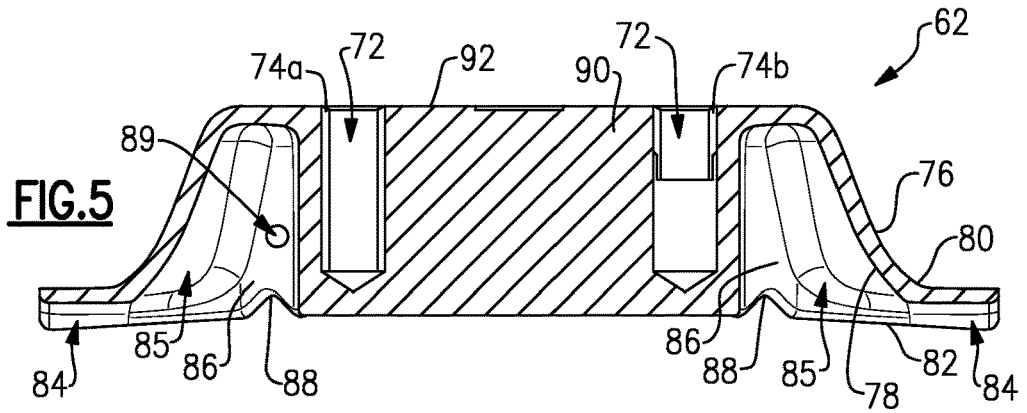
FIG. 5 is a cross-sectional view taken along line AA of FIG. 4.

FIG. 4 shows a top view of the bolt attachment 62 including fastener openings 72. The fastener openings 72 are molded into the bolt attachment and include inserts 74 for threadably engaging fasteners. The inserts 74 include a threaded outer surface for directly engaging the fastener opening 72 on the bolt attachment 62 and a threaded inner surface for mating with the bolts 70 (FIG. 3). A helical insert 74a or key-lock insert 74b may be utilized as the inserts 74 (FIG. 5). Examples of brand names for the inserts 74 would be Helicoil™ or Keensert™.

The helical insert 74a includes a helical coil that is threaded into the fastener opening 72 that engages the fastener opening 72 on an outer side and includes threads on an inner side for engaging the bolt 70. The key-lock insert 74b includes a generally solid body with a threaded exterior that is threaded into the fastener opening 72 and a threaded interior for engaging the bolt 70. After the key-lock insert 74b is threaded into the fastener opening 72, locks slide in the axial direction along the exterior of the key-lock insert 74b to prevent the key-lock insert 74b from rotating relative to the fastener opening 72.

As shown in FIG. 5, the helical insert 74a extends substantially the length of the fastener opening 72 to increase the contact between the insert 74 and the fastener opening 72 and the retention of the insert 74 to the bolt attachment 62. This allows fewer bolt attachments 62 to be utilized to retain the component 64 without the bolts 70 pulling out of the bolt attachment 62.

The bolt attachment 62 includes an outer wall 76 surrounding the boss 90. A distal end of the boss 90 may be attached to the fan case 60 to increase the strength of attachment between the bolt attachment 62 and the fan case 60.

The outer wall 76 includes an inner surface 78 and an outer surface 80. The outer wall 76 includes a generally concave profile. A mate face 82 is located on a lower surface of the outer wall 76 at a distal end for engaging the fan case 60. The mate face 82 includes a first portion 82a and a second portion 82b (FIG. 6) separated by elongated channels 84 extending through the outer wall 76 along the distal edge. The mate face 82 may also include a concave curvature to match the curvature of the fan case 60.

Although the elongated channels 84 are shown adjacent the mate face 82 in the illustrated example, the elongated channels 84 could be located in the outer wall 76 spaced from the mate face 82. The elongated channels 84 allow for pressure equalization between at least one internal cavity 85 formed by the bolt attachment 62 and the fan case 60. Multiple ribs 86 extend between an inner surface 78 of the outer wall 76 and the boss 90 to define the at least one internal cavity 85. The elongated channels 84 also provide for fluid drainage from the at least one internal cavity to prevent trapped water from freezing and causing the bolt attachment 62 to disband as the water expands.

A distal edge of the rib 86 includes a recessed portion 88 extending through the rib 86 to fluidly connect adjacent internal cavities 85 that are at least partially defined by the rib 86. In the illustrated example, the recessed portion 88 is located at distal ends of the rib 86.

A passage 89 could also be located in a mid-portion of the rib 86 that extends completely through the rib 86 to fluidly connect adjacent internal cavities 85. The passage 89 can be used in addition to the recessed portion 88 or in place of the recessed portion 88. When the passage 89 is used in place of the recessed portion 88, the entire distal edge of the rib 86 can be attached directly to the fan case 60 and increase the attachment strength between the bolt attachment 62 and the fan case 60.

The recessed portion 88 and the elongated channel 84 allow for pressure equalization between the adjacent internal cavities 85 and the environment surrounding the bolt attachment 62. This prevents excess positive or negative pressure from building within the bolt attachment 62 that could weaken the bond between the outer surface of the fan case 60 and the bolt attachment 62.

Figure 6:
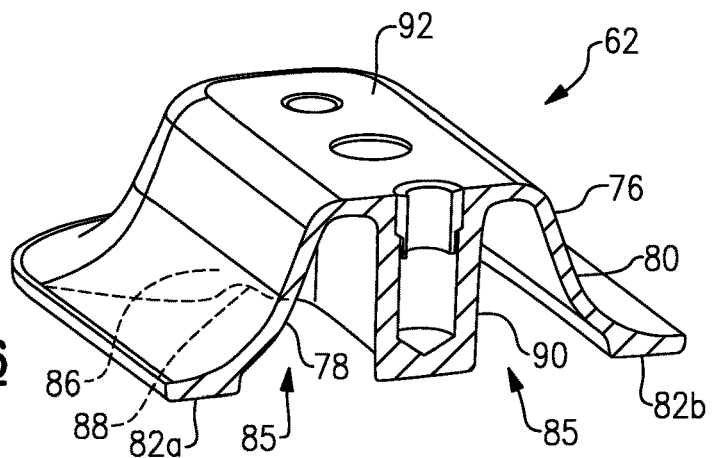
FIG. 6 is a cross-sectional view taken along line BB of FIG. 4.

As shown in FIG. 6, the boss 90 and the outer wall 76 form a platform 92 for engaging the bracket 68 or another device for attaching to the bolt attachment 62. Although the illustrated example shows two fastener openings 72, the bolt attachment 62 could include only one fastener opening 72 or more than two fastener openings 72.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A fan case comprising:
a composite fan case body including an outer surface; and
at least one attachment tool attached to the outer surface of the composite fan case body, the at least one attachment tool including a boss having at least one fastener opening with a threaded insert, and a channel extending from at least one interior cavity of the attachment tool through an outer wall of the attachment tool, wherein at least one rib extends between the outer wall and the boss partially and the at least one rib partially defines the at least one interior cavity and includes at least one of a passage or a recessed area extending through the at least one rib to fluidly connect adjacent interior cavities.

2. The fan case as recited in claim 1, wherein the fan case is made of a composite material and includes an accessory attached to the at least one of the attachment tool.

3. The fan case as recited in claim 1, wherein the at least one attachment tool is made of at least one of a molded thermoplastic material or a fabricated material.

4. The fan case as recited in claim 3, wherein the threaded insert directly engages the molded thermoplastic material of the at least one attachment tool.

5. The fan case as recited in claim 4, wherein the threaded insert includes at least one of a helical insert or a key-locking insert.

6. The fan case as recited in claim 1, wherein the at least one attachment tool is bonded directly to the outer surface on the composite fan case.

7. The fan case as recited in claim 1, further comprising a mate face on a distal end of the outer wall for engaging the fan case.

8. The fan case as recited in claim 7, wherein the channel separates the mate face between a first mate face and a second mate face.

9. An attachment tool for being attached to an outer surface of a fan case in a gas turbine engine comprising:
a boss having at least one fastener opening for accepting a threaded insert for engaging a fastener;
an outer wall spaced from the boss forming at least one interior cavity;
a channel extending from the at least one interior cavity through the outer wall; and
at least one rib extending between the outer wall and the boss, wherein the at least one rib partially defines the at least one interior cavity and includes at least one of a passage or a recessed area extending through the at least one rib to fluidly connect adjacent interior cavities.

10. The attachment tool as recited in claim 9, wherein the attachment tool is made of a molded thermoplastic material and the threaded insert directly engages the molded thermoplastic material.

11. The attachment tool as recited in claim 9, wherein the threaded insert includes at least one of a helical insert or a key-locking insert.

12. The attachment tool as recited in claim 9, further comprising a mate face on a distal end of the outer wall for engaging the fan case, wherein the channel separates the made face between a first mate face and a second mate face.

* * * * *